United States Patent  
Sakai et al.

(10) Patent No.: US 11,691,675 B2  
(45) Date of Patent: Jul. 4, 2023

(54) VEHICLE BODY REINFORCEMENT STRUCTURE

(71) Applicant: HONDA MOTOR CO., LTD., Tokyo (JP)

(72) Inventors: Hiroyuki Sakai, Wako (JP); Daisuke Ebihara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 85 days.

(21) Appl. No.: 17/433,619

(22) PCT Filed: Jan. 30, 2020

(86) PCT No.: PCT/JP2020/003332  
§ 371 (c)(1),  
(2) Date: Aug. 25, 2021

(87) PCT Pub. No.: WO2020/174992  
PCT Pub. Date: Sep. 3, 2020

(65) Prior Publication Data  
US 2022/0144344 A1 May 12, 2022

(30) Foreign Application Priority Data  
Feb. 28, 2019 (JP) .................. 2019-035576

(51) Int. Cl.  
*B62D 25/04* (2006.01)  
*B62D 27/02* (2006.01)  
(Continued)

(52) U.S. Cl.  
CPC ........... *B62D 25/04* (2013.01); *B62D 27/023* (2013.01); *B62D 29/002* (2013.01); *B62D 25/025* (2013.01)

(58) Field of Classification Search  
CPC ...... B62D 25/04; B62D 25/02; B62D 25/025; B62D 27/023; B62D 21/157; B62D 29/001; B62D 29/002  
(Continued)

(56) References Cited

FOREIGN PATENT DOCUMENTS

CN 105531180 4/2016  
CN 107031731 8/2017  
(Continued)

OTHER PUBLICATIONS

International Search Report and Written Opinion for International Application No. PCT/JP2020/003332 dated Mar. 31, 2020, 10 pages.

(Continued)

*Primary Examiner* — Dennis H Pedder  
(74) *Attorney, Agent, or Firm* — Amin, Turocy & Watson, LLP

(57) ABSTRACT

A vehicle body reinforcement structure includes an elongated hollow structure formed by jointing an outer panel and an inner panel with each other, and a reinforcement member configured to partition the hollow structure into a lower closed cross section and an upper closed cross section. At inside of at least one of the lower closed cross section and the upper closed cross section, at least a pair of bulkheads extending so as to cross the closed cross section are disposed so as to be separated with each other in a direction in which the closed cross section is extending. A space between the pair of bulkheads is made as a filler chamber which is filled with filler. A filling opening for the filler is provided on the inner panel so that the filling opening is in communication with the filler chamber.

5 Claims, 6 Drawing Sheets

(51) Int. Cl.
*B62D 29/00* (2006.01)
*B62D 25/02* (2006.01)

(58) Field of Classification Search
USPC ..... 296/203.01, 203.04, 29, 30, 193.06, 209
See application file for complete search history.

(56) References Cited

FOREIGN PATENT DOCUMENTS

| | | |
|---|---|---|
| JP | 01-059784 | 4/1989 |
| JP | 05-208688 | 8/1993 |
| JP | 2000-158471 | 6/2000 |
| JP | 2000-211551 | 8/2000 |
| JP | 2006-312358 | 11/2006 |
| JP | 2017-043136 | 3/2017 |

OTHER PUBLICATIONS

Chinese Office Action for Chinese Patent Application No. 202080008336.6 dated Nov. 22, 2022.

VEHICLE BODY REINFORCEMENT STRUCTURE

TECHNICAL FIELD

The present invention relates to a vehicle body reinforcement structure including a rear wheelhouse configured to cover a rear wheel from an outer side.

Priority is claimed on Japanese Patent Application No. 2019-035576, filed Feb. 28, 2019, the content of which is incorporated herein by reference.

BACKGROUND ART

A rear wheelhouse (an inner panel) configured to cover a rear wheel from an outer side is provided on a rear side portion of a vehicle body. A side outer panel (an outer panel) is bonded to an outer side of a rear wheelhouse, and a closed cross section (a hollow structure) extending substantially along an outer circumferential surface shape of the rear wheel around a door opening section is provided in an elongated shape between the jointing section of the side outer panel and the rear wheelhouse.

In recent years, in such a vehicle body reinforcement structure, in order to further enhance steering stability and receive an impact load from the side of the vehicle body more advantageously, it is desired to improve the rigidity around the rear wheelhouse. As a countermeasure, there is an invention in which a wheelhouse reinforcement member (a reinforcement member) is jointed to an upper surface side of the rear wheelhouse, a reinforcement closed cross section (a lower closed cross section) is formed between the wheelhouse reinforcement member and the rear wheelhouse, and a neighboring closed cross section (upper closed cross section) is formed between the wheelhouse reinforcement member and the side outer panel (for example, see Patent Literature 1).

CITATION LIST

Patent Literature

Patent Literature 1

Japanese Unexamined Patent Application, First Publication No. 2006-312358

SUMMARY OF INVENTION

Technical Problem

The vehicle body reinforcement structure disclosed in Patent Literature 1 can enhance rigidity around the rear wheelhouse by the reinforcement closed cross section formed between the wheelhouse reinforcement member and the rear wheelhouse. However, in a portion around the rear wheelhouse, in particular, adjacent to a connecting section to a side sill of the rear wheel at the front side section, considering accessibility for an occupant from the door opening, since the space in which the closed cross-sectional structure for reinforcement can be disposed is limited, it is not possible to secure a sufficiently large closed cross-sectional structure for reinforcement. For this reason, it is desired to further enhance the rigidity around the rear wheelhouse in the limited disposition space.

The aspect of the present invention provides a vehicle body reinforcement structure capable of further enhancing strength and rigidity of a vehicle body frame around an inner panel using a compact structure without occupying a large space.

Solution to Problem

A vehicle body reinforcement structure according to the present invention employs the following configurations.

(1) A vehicle body reinforcement structure according to the present invention includes an elongated hollow structure formed by jointing an outer panel and an inner panel with each other; and a reinforcement member configured to partition the hollow structure into a lower closed cross section and an upper closed cross section, wherein, at inside of at least one of the lower closed cross section and the upper closed cross section, at least a pair of bulkheads extending so as to cross the closed cross section are disposed so as to be separated with each other in a direction in which the closed cross section is extending, a space between the pair of bulkheads is made as a filler chamber which is filled with filler, and a filling opening for the filler is provided in the inner panel so that the filling opening is in communication with the filler chamber.

According to this configuration of the aspect of the above-mentioned (1), the elongated hollow structure between the inner panel and the outer panel is partitioned into the lower closed cross section and the upper closed cross section by the reinforcement member to increase strength and rigidity in the longitudinal direction. Then, deformation of the lower closed cross section or the upper closed cross section in a collapse direction is restricted by the bulkheads, and strength and rigidity in a direction perpendicular to the longitudinal direction are increased. Further, the filler chamber filled with filler can further increase strength and rigidity of the upper closed cross section or the lower closed cross section. When a liquid material is used as the filler, even a narrow filler chamber can be filled with the filler. The filler with which the filler chamber is filled can increase damping properties and achieve reduction in vehicle body vibrations, and entry of noise into the passenger compartment can be minimized.

(2) In the aspect of the above-mentioned (1), the bulkhead may be constituted by two types of bulkheads, including a first bulkhead disposed inside of the lower closed cross section and a second bulkhead disposed inside of the upper closed cross section.

In this case, collapse deformation of the lower closed cross section and the upper closed cross section is restricted by the first bulkhead and the second bulkhead, and thus strength and rigidity in the direction perpendicular to the longitudinal direction are increased. Accordingly, in the hollow structure between the inner panel and the outer panel, strength and rigidity are efficiently increased by the reinforcement member, the first bulkhead and the second bulkhead. Accordingly, when this configuration is employed, strength and tolerance with respect to an impact load input from a side of the vehicle is increased, and strength with respect to bending stress in the upward/downward direction is also increased.

(3) In the aspect of the above-mentioned (2), the first bulkhead may have a lower end coupled to an upper surface of the inner panel, and an upper end coupled to a lower surface of an upper wall of the reinforcement member.

In this case, collapse of the lower closed cross section in the upward/downward direction between the upper wall and the inner panel of the reinforcement member can be reliably restricted by the first bulkhead. For this reason, even in an area in which a cross-sectional area of the lower closed cross section cannot easily be sufficiently secured, collapse of the lower closed cross section in the upward/downward direction can be minimized.

(4) In the aspect of the above-mentioned (3), an opening section configured to allow insertion of a tool configured to couple the lower end of the first bulkhead to the upper surface of the inner panel may be formed in the upper wall of the reinforcement member.

In this case, work of inserting a tool into the opening section of the upper wall of the reinforcement member and coupling the lower end of the first bulkhead to the upper surface of the inner panel can be easily performed through the opening section. For this reason, a technique of previously fixing the reinforcement member to the first bulkhead, coupling the reinforcement member to the upper surface side of the inner panel in this state and coupling the lower end of the first bulkhead to the upper surface of the inner panel can be employed. Assembly efficiency can be improved and productivity can be increased by employing this technique.

(5) In the aspect of the above-mentioned (2), the first bulkhead may have an upper jointing piece coupled to a lower surface of the upper wall of the reinforcement member, the second bulkhead may have a lower jointing piece coupled to an upper surface of the upper wall of the reinforcement member, and the upper jointing piece and the lower jointing piece may be coupled in three-layered state in which the upper wall of the reinforcement member is interposed between the upper jointing piece and the lower jointing piece.

In this case, in a state in which the upper jointing piece of the first bulkhead and the lower jointing piece of the second bulkhead are overlapped with the upper wall of the reinforcement member, they can be simultaneously coupled through spot welding, by rivet stoppers, or the like. Accordingly, when this configuration is employed, productivity can be increased.

(6) In the aspect of the above-mentioned (2), a space in the lower closed cross section between the pair of first bulkheads may be made as a first filler chamber filled with the filler, a space in the upper closed cross section between the pair of second bulkheads may be made as a second filler chamber filled with the filler, the filling opening for the filler may be provided on a wall of the inner panel that faces the first filler chamber or the second filler chamber, and a communication hole configured to bring the second filler chamber and the first filler chamber in communication with each other may be provided in the upper wall of the reinforcement member.

In this case, when the filler is filled from the filling opening of the inner panel, any one of the first filler chamber and the second filler chamber is filled with the filler, and the other is also filled with the filler through the communication hole. Accordingly, strength and rigidity of the upper closed cross section and the lower closed cross section around the inner panel can be increased by the filler. In addition, when this configuration is employed, the upper closed cross section and the lower closed cross section can be easily filled with the filler. As the filler, for example, a cellular porous medium having damping properties or sound insulating properties, such as insulating urethane foam or the like, can be used. When such a cellular porous medium is used as the filler, reduction in vehicle body vibrations can be achieved, and entry of noise into the passenger compartment can be minimized.

Advantageous Effects of Invention

According to the aspect of the present invention, the hollow structure between the inner panel and the outer panel is partitioned into the lower closed cross section and the upper closed cross section by the reinforcement member, and at least one pair of bulkheads are provided in at least one of the lower closed cross section and the upper closed cross section while being separated in the extension direction of the closed cross section. Then, the filler chambers in the closed cross sections partitioned by the pair of bulkheads are filled with the filler through the filling opening. Accordingly, when this configuration of the present invention is employed, strength and rigidity around the inner panel can be further increased by a compact structure that does not occupy a large space.

DESCRIPTION OF EMBODIMENTS

Figure 1:
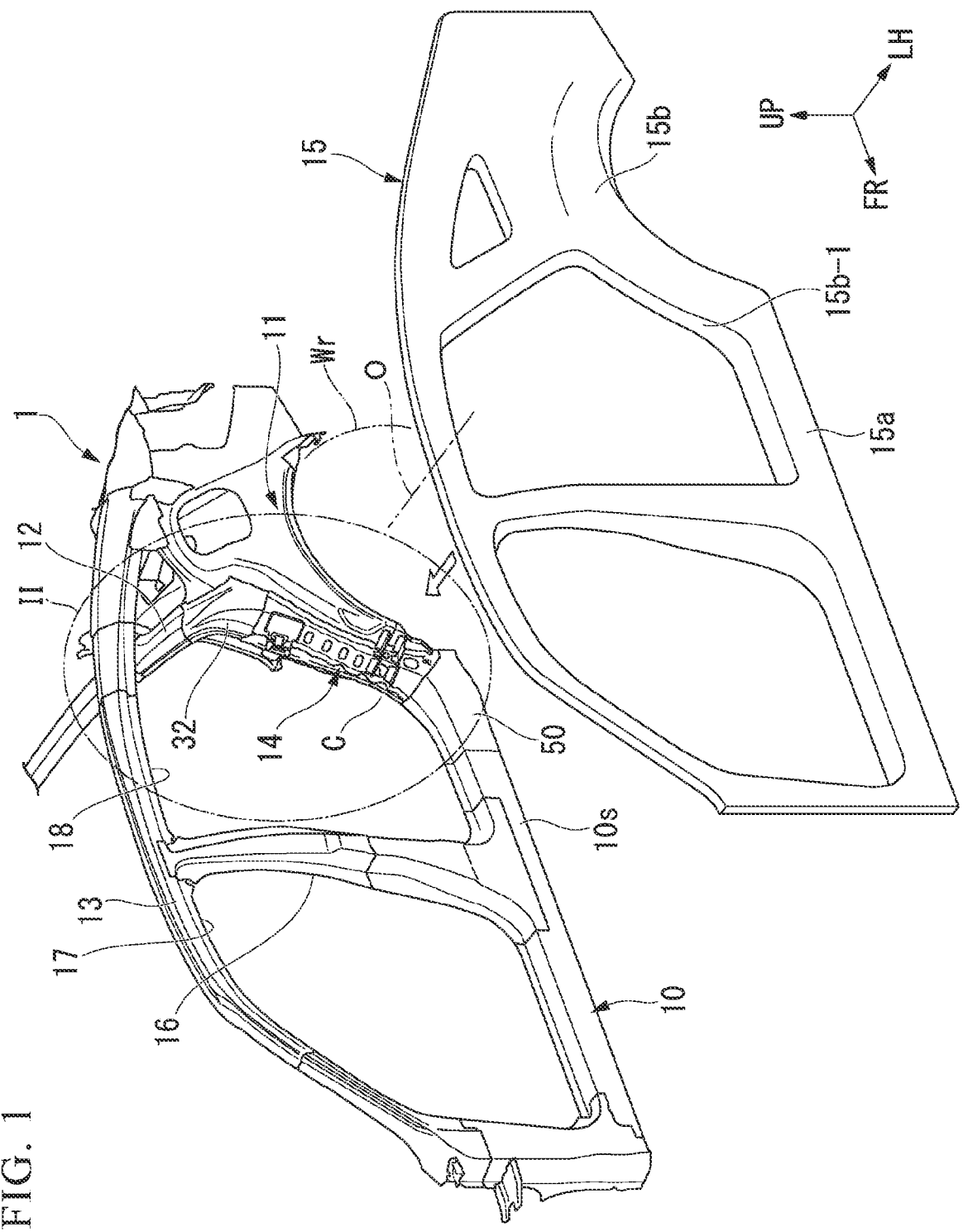
FIG. 1 is an exploded perspective view of a vehicle of an embodiment.

Hereinafter, an embodiment of the present invention will be described with reference to the accompanying drawings. Further, directions of forward, rearward, upward, downward, leftward and rightward in the following description are directions of forward, rearward, upward, downward, leftward and rightward in a vehicle unless the text indicates otherwise. In addition, in the drawings used in the following description, an arrow UP indicates an upward direction with respect to the vehicle, an arrow FR indicates a forward direction with respect to a vehicle, and an arrow LH indicates a leftward direction with respect to the vehicle.

Figure 2:
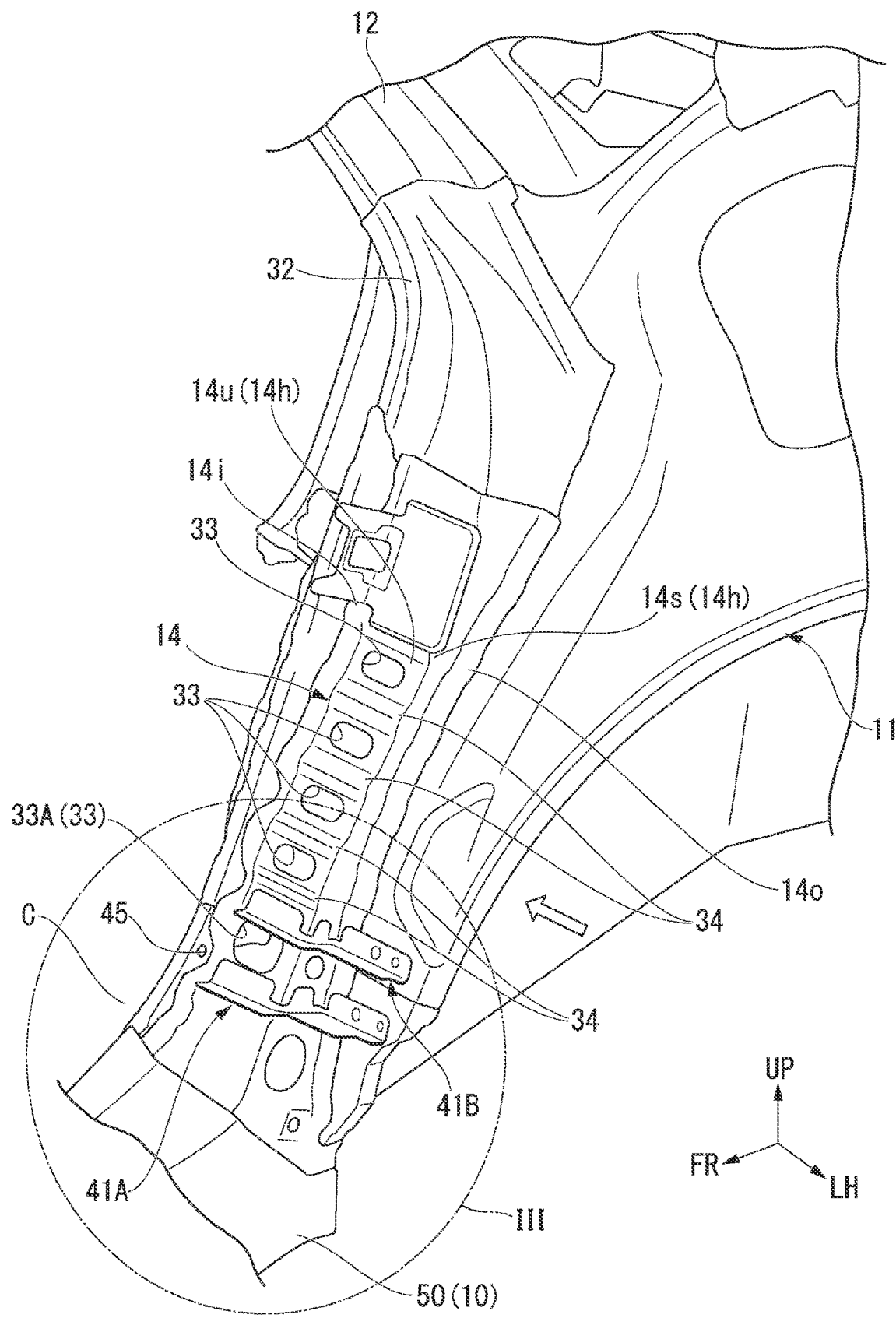
FIG. 2 is an enlarged view of a portion II in FIG. 1 of the vehicle of the embodiment.

FIG. 1 is an exploded perspective view of a vehicle body 1 of a vehicle of an embodiment from a left front above, and FIG. 2 is an enlarged view of a portion II of FIG. 1. The vehicle body 1 of the embodiment is formed substantially laterally symmetrically. Hereinafter, a vehicle body reinforcement structure will be described with reference to the drawings showing a left side surface of the vehicle body 1.

As shown in FIGS. 1 and 2, the vehicle body 1 includes a side sill 10, a rear wheelhouse 11, a quarter pillar 12, a roof side rail 13, a wheelhouse reinforcement member 14, and a side outer panel 15.

The side sill 10 is disposed at a side lower end position on an outer side of a passenger compartment, and extends substantially in a vehicle body forward/rearward direction. The rear wheelhouse 11 is disposed to cover the outer side of a rear wheel Wr at a rear section side of the side sill 10. The quarter pillar 12 extends to be inclined to front and upper side from the vicinity of a top section of the rear wheelhouse 11 toward the roof side rail 13, and an upper end portion that is coupled to the roof side rail 13. The roof side rail 13 extends substantially in the vehicle body forward/rearward direction at the side section of the roof section of the vehicle body. The wheelhouse reinforcement member 14 is joined to an upper surface of the front section of the rear wheelhouse 11 closer to the front, and extends toward the rear section of the side sill 10.

The side outer panel 15 is a panel member that forms a design surface of a vehicle side section. The side outer panel 15 has a side sill outer section 15a that constitutes a part of the side sill 10 at an outer side of the vehicle, and a wheelhouse section 15b configured to cover the rear wheelhouse 11 from an outer side.

In the embodiment, the rear wheelhouse 11 constitutes an inner panel, and the side outer panel 15 constitutes an outer panel. In addition, the wheel reinforcement member constitutes a reinforcement member.

In the side sill 10, a side sill stiffener 10s is coupled to an outer side of the inner side sill (not shown), and a closed cross section is formed both of them. In addition, the side sill outer section 15a of the side outer panel 15 is coupled to an outer side of the side sill stiffener 10s. A closed cross section is also formed between the side sill stiffener 10s and the side sill outer section 15a. In addition, a side sill reinforcement member 50 is integrally coupled to a rear end portion of the side sill stiffener 10s, and the side sill reinforcement member 50 is coupled to a front region of the rear wheelhouse 11.

In addition, substantially central sections of the side sill 10 and the roof side rail 13 in the vehicle body forward/rearward direction are connected by a center pillar 16. A front section-side door opening 17 opened and closed by a front door (not shown) is provided on a front side of the center pillar 16, and a rear section-side door opening 18 opened and closed by a rear door (not shown) is provided on a rear side of the center pillar 16. The rear section-side door opening 18 is configured to be surrounded by the center pillar 16, the side sill 10, the front region of the rear wheelhouse 11, the quarter pillar 12, and the roof side rail 13. A corner portion C of a rear lower end of the rear section-side door opening 18 is formed in substantially a V shape by a connecting section between the front region of the rear wheelhouse 11 and the rear region of the side sill 10 when seen in a side view. In the vicinity section of the V-shaped region when seen in a side view, the cross-sectional area must be made smaller in order not to sacrifice ease of access for the occupant. For this reason, the front region of the rear wheelhouse 11 has been devised with the cross-sectional structure that can obtain high strength and rigidity in the limited space.

A cross-sectional structure of the portion will be described below in detail.

Figure 3:
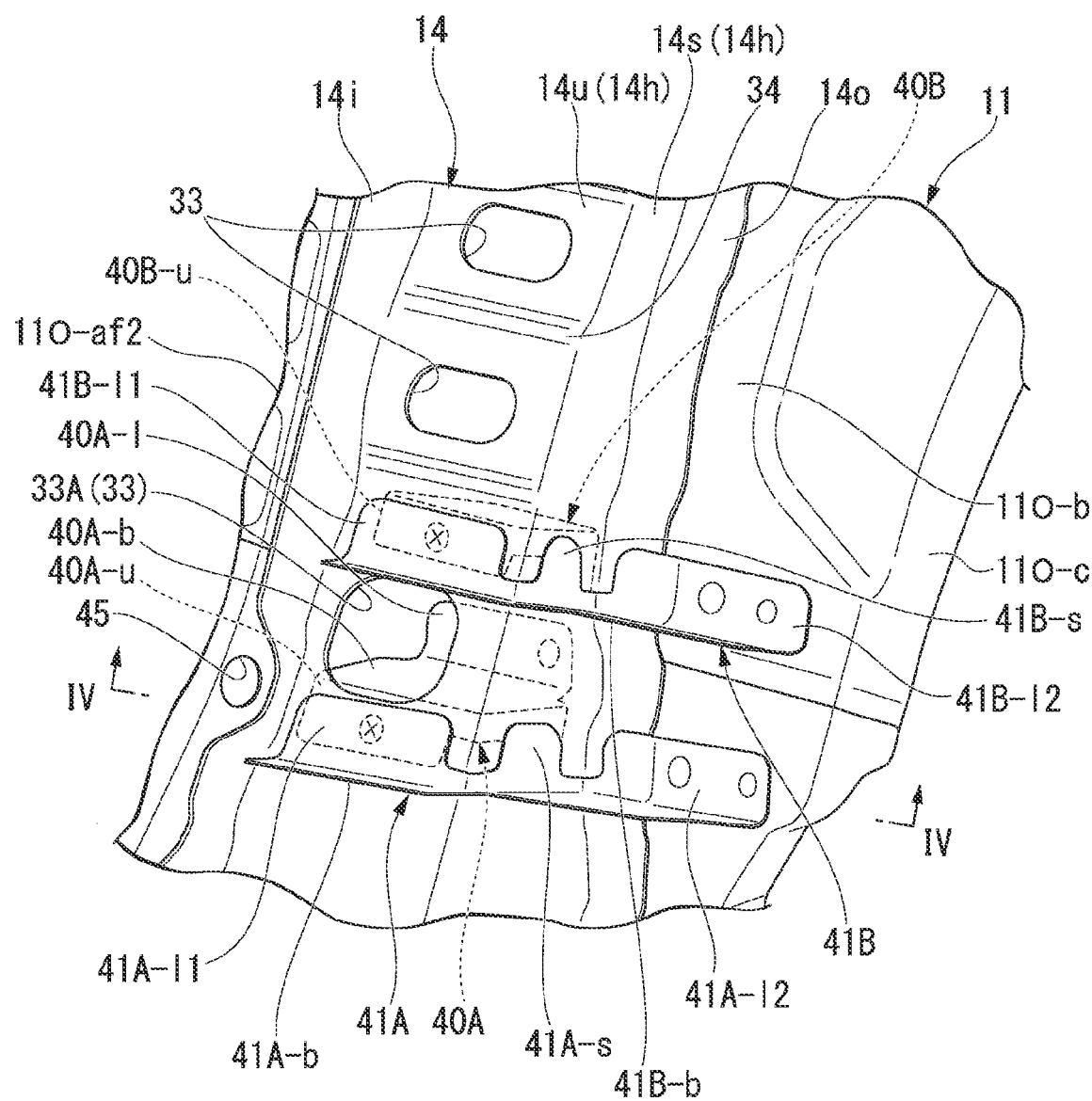
FIG. 3 is an enlarged view of a portion III in FIG. 2 of the vehicle of the embodiment.
Figure 4:
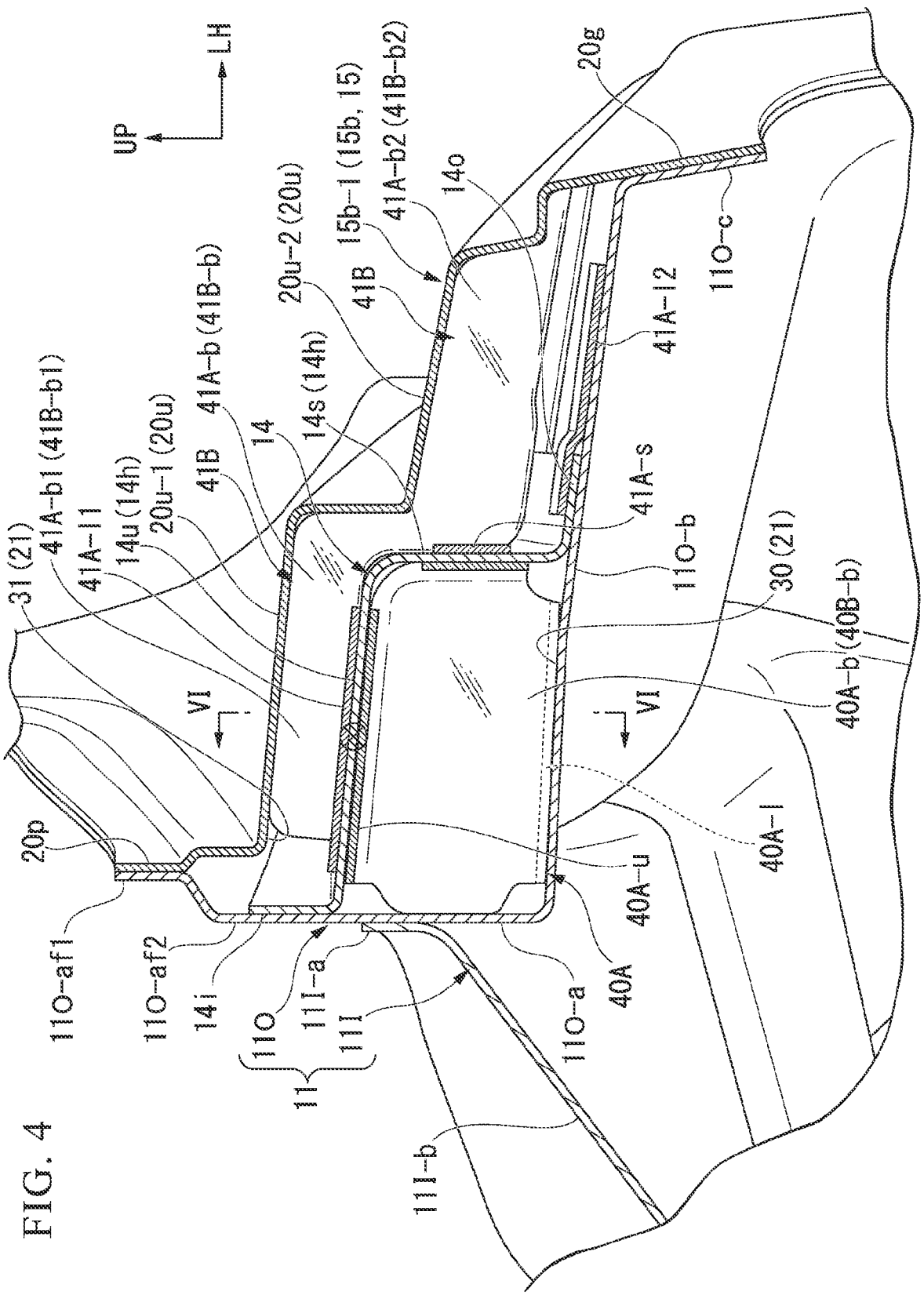
FIG. 4 is a cross-sectional view corresponding to a cross section IV-IV in FIG. 3 of the vehicle of the embodiment.

FIG. 3 is an enlarged view of a portion III in FIG. 2, and FIG. 4 is a cross-sectional view corresponding to a cross section IV-IV in FIG. 3.

As shown in FIG. 4, the rear wheelhouse 11 includes an inner rear wheelhouse 11I that is a panel member disposed on an inner side in the vehicle width direction, and an outer rear wheelhouse 11O that is a panel member disposed on an outer side in the vehicle width direction. The inner rear wheelhouse 11I has an inner base wall 11I-b opposite to an outer circumferential surface of the rear wheel Wr, and an inner standing wall 11I-a extending from an outer end of the inner base wall 11I-b in the vehicle width direction toward an outer side of the rear wheel Wr in the radial direction. The outer rear wheelhouse 11O has an outer base wall 11O-b opposite to the outer circumferential surface of the rear wheel Wr, an outer standing wall 11O-a extending from an inner end of the outer base wall 11O-b in the vehicle width direction toward an outer side of the rear wheel Wr in the radial direction, and an inward flange section 11O-c extending in the axial direction of the rear wheel Wr from an outer end of the outer base wall 11O-b in the vehicle width direction.

In the inner rear wheelhouse 11I and the outer rear wheelhouse 11O, the inner standing wall 11I-a and the outer standing wall 11O-a overlap each other, and the inner standing wall 11I-a and the outer standing wall 11O-a are bonded to each other through spot welding.

The outer base wall 11O-b of the outer rear wheelhouse 11O is disposed at a position closer to the rear wheel Wr than a root section of the inner base wall 11I-b of the inner rear wheelhouse 11I, and a lower closed cross section 30, which will be described below, is enlarged. That is, the outer standing wall 11O-a of the outer rear wheelhouse 11O extends downward from a overlapped section (a jointing section) with the inner standing wall 11I-a of the inner rear wheelhouse 11I, and the outer base wall 11O-b extends to be bent at a right angle from a lower end of the outer standing wall 11O-a to an outer side in the vehicle width direction.

The outer standing wall 11O-a of the outer rear wheelhouse 11O extends straightly upward after an upper end-side region is bent in a crank shape to a further outer side in the vehicle width direction than the overlapped section (the jointing section) overlapping with the inner standing wall 11I-a. Hereinafter, the straightly extending portion is referred to as an upper end flange section 11O-af1, and the overlapped section with the inner standing wall 11I-a is referred to as an intermediate flange section 11O-af2.

A front region 15b-1 of the wheelhouse section 15b of the side outer panel 15 facing the rear section-side door opening 18 has an upper wall 20u configured to cover the outer base wall 11O-b of the outer rear wheelhouse 11O from above, a standing wall 20p extending upward from an inner end portion of the upper wall 20u in the vehicle width direction (toward an outer side of the rear wheel Wr in the radial direction), and an inward flange section 20g extending downward from an outer end portion of the upper wall 20u in the vehicle width direction (toward the axial direction of the rear wheel Wr). The upper wall 20u is formed to be bent in a step shape toward an outer side in the vehicle width direction. Hereinafter, a higher area of the upper wall 20u located inside in the vehicle width direction is referred to as a higher order section 20u-1, and a lower area located outside in the vehicle width direction is referred to as a lower order section 20u-2. The standing wall 20p overlaps the upper end flange section 11O-af1 of the outer rear wheelhouse 11O from an outer side in the vehicle width direction, and is bonded to the upper end flange section 11O-af1 through spot welding or the like. In addition, the inward flange section 20g overlaps the inward flange section 11O-c of the outer rear wheelhouse 11O from an outer side in the vehicle width direction, and is bonded to the inward flange section 11O-c through spot welding or the like.

The wheelhouse section 15b of the side outer panel 15 is jointed to the outer rear wheelhouse 11O, and thus a closed cross section 21 is formed between the outer rear wheelhouse 11O and the wheelhouse section 15b substantially along an outer circumferential surface of the rear wheel Wr.

The wheelhouse reinforcement member 14 is disposed inside the closed cross section 21 (a hollow structure) between the front region 15b-1 of the wheelhouse section 15b and the outer rear wheelhouse 11O, and the inside of the closed cross section 21 is partitioned into the lower closed cross section 30 and an upper closed cross section 31. The front end portion of the wheelhouse reinforcement member 14 extends to the rear section of the side sill 10, and is coupled to the side sill reinforcement member 50 of the rear section of the side sill 10. In addition, a rear end portion of the wheelhouse reinforcement member 14 extends to the vicinity of the lower end of the quarter pillar 12, and is coupled to the lower end of the quarter pillar 12 via a reinforcement member 32 (see FIGS. 1 and 2). Further, the quarter pillar 12 is not limited to a hollow structure and may be an open cross section.

The wheelhouse reinforcement member 14 includes an upper wall 14*u*, a reinforcement member main body section 14*h* having a sidewall 14*s* bent downward from an outer end portion of the upper wall 14*u* in the vehicle width direction, an outer flange section 14*o* extending from a lower end of the sidewall 14*s* of the reinforcement member main body section 14*h* to an outer side in the vehicle width direction, and an inner flange section 14*i* extending from an inner end portion of the upper wall 14*u* of the reinforcement member main body section 14*h* in the vehicle width direction to an outer side of the rear wheel Wr in the radial direction (substantially above). The outer flange section 14*o* constitutes an outer jointing section jointed to the upper surface of the outer base wall 11O-b of the outer rear wheelhouse 11O, and the inner flange section 14*i* constitutes an inner jointing section jointed to an outer surface of the outer standing wall 11O-a (the intermediate flange section 11O-af2) of the outer rear wheelhouse 11O in the vehicle width direction.

As shown in FIGS. 2 and 3, a plurality of opening sections 33 are formed in the upper wall 14*u* of the wheelhouse reinforcement member 14 and are separated from each other in the longitudinal direction. Each of the opening sections 33 formed in a long hole shape elongated in the vehicle width direction. In addition, beads 34 extending substantially in the vehicle width direction are formed between the neighboring opening sections 33 of the upper wall 14*u*. The opening sections 33A disposed on the foremost side (a lower side) is formed in an opening area larger than the other opening sections 33.

Figure 5:
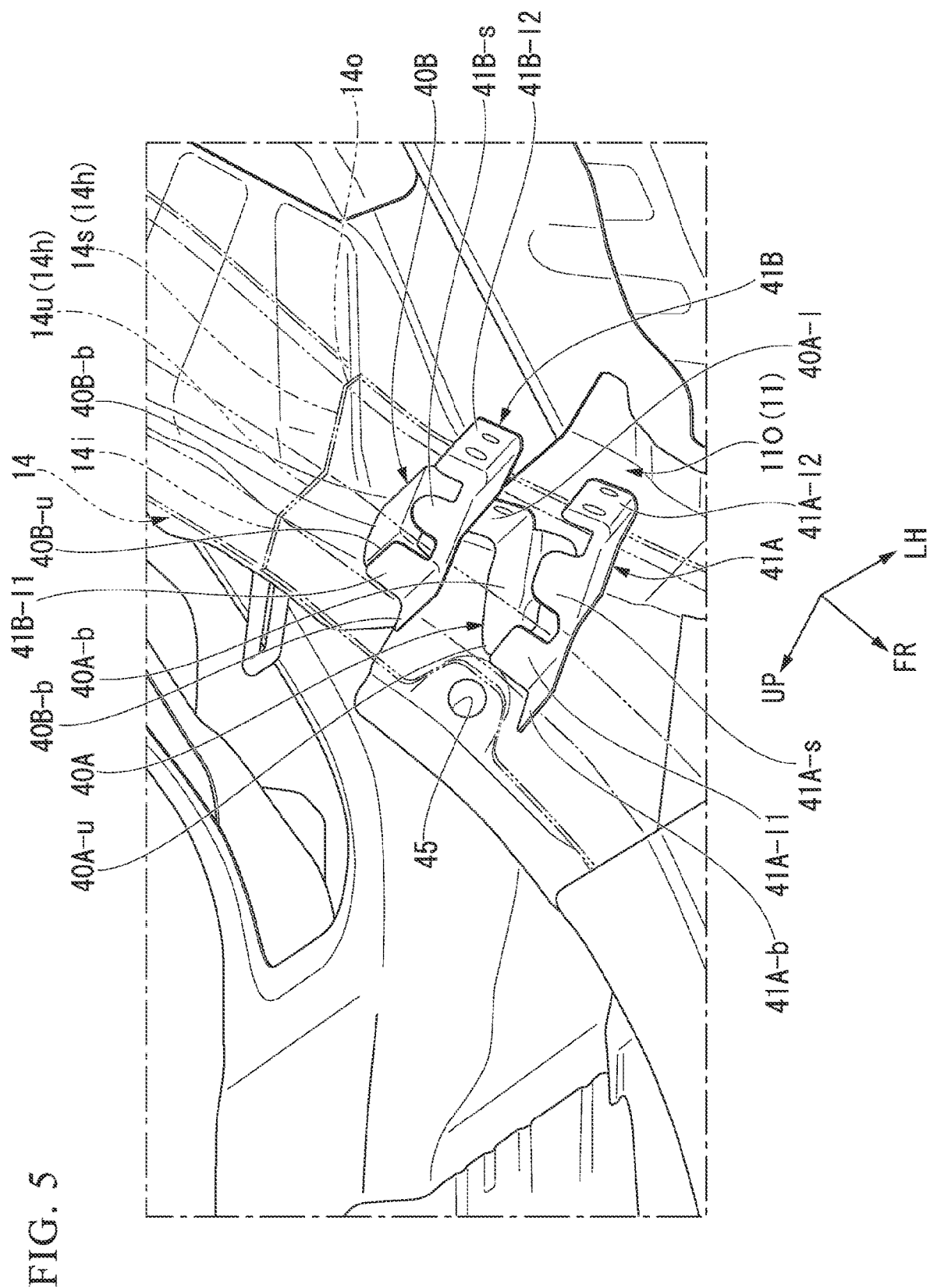
FIG. 5 is a perspective view showing a bulkhead of the embodiment together with peripheral parts.
Figure 6:
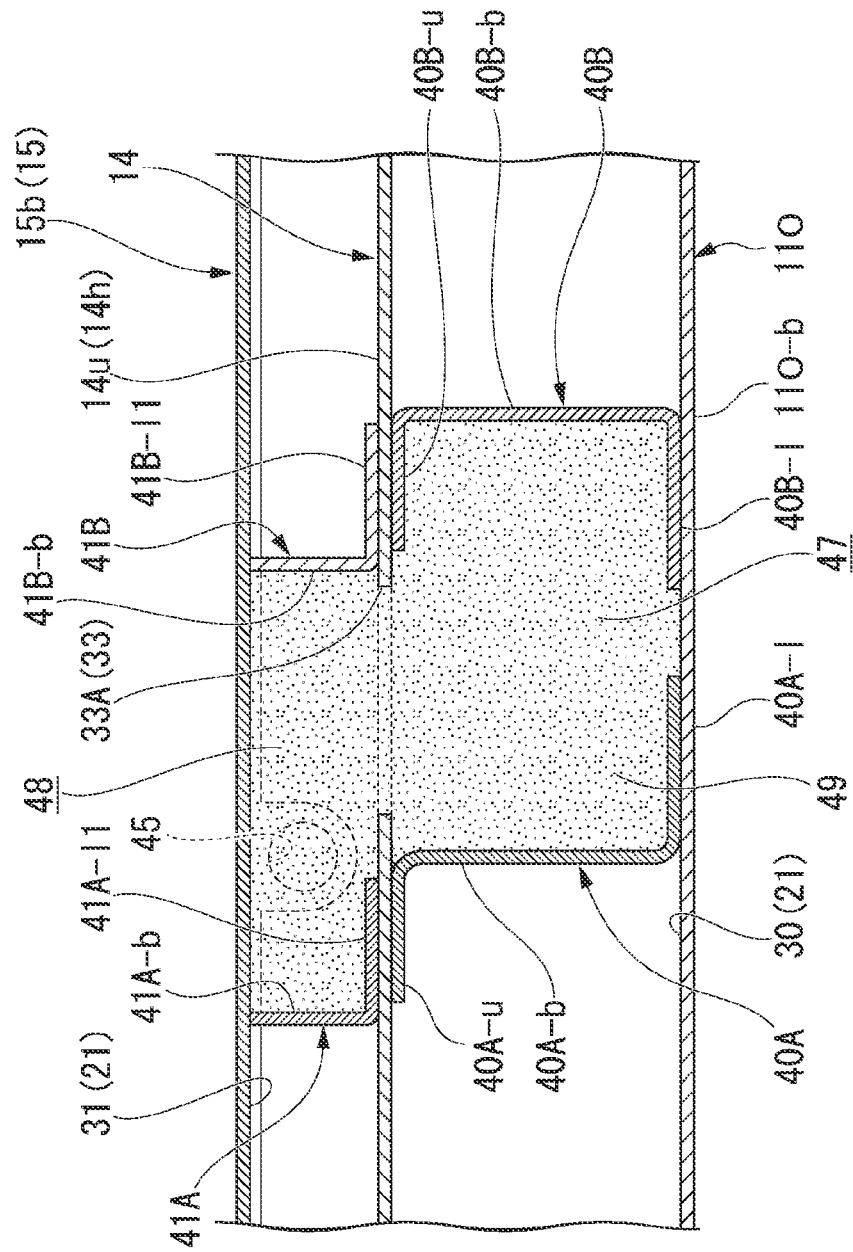
FIG. 6 is a cross-sectional view corresponding to a cross section VI-VI in FIG. 4 of the vehicle of the embodiment.

FIG. 5 is a perspective view of almost the same portion as FIG. 3 with some members such as the wheelhouse reinforcement member 14 or the like are removed, and FIG. 6 is a cross-sectional view corresponding to a cross section VI-VI in FIG. 4.

A pair of first bulkheads 40A and 40B extending so as to cross the lower closed cross section 30 are disposed on the lower closed cross section 30 below the wheelhouse reinforcement member 14. The pair of first bulkheads 40A and 40B are disposed at two positions that are separated from each other in the longitudinal direction (substantially in the vehicle forward/rearward direction) of the wheelhouse reinforcement member 14. More specifically, the pair of first bulkheads 40A and 40B are disposed at two positions that have the opening section 33A of the upper wall 14*u* inside the wheelhouse reinforcement member 14 interposed therebetween. The lower closed cross section 30 is partitioned by the pair of first bulkheads 40A and 40B, and thus, a first filler chamber 47 filled with filler 49 is formed between the first bulkheads 40A and 40B. As the filler 49, a cellular porous medium having damping properties or sound insulating properties, for example, an insulating urethane foam or the like of a refrigerator can be used. In addition, it can be easily installed by using 1-liquid type foaming urethane spray. This is formed by adding and foaming a foaming agent in a urethane resin (polyurethane). Not like a two-liquid mixing type like aqua foam, it can be easily foamed by inserting a nozzle of a gun into a filling opening and without heating the foam in the closed cross section such as like a can spray. This is also referred to as rigid urethane foam.

Meanwhile, a pair of second bulkheads 41A and 41B extending to cross the upper closed cross section 31 are disposed on the upper closed cross section 31 at an outer side (upper side and outer side) of the wheelhouse reinforcement member 14. The pair of second bulkheads 41A and 41B are disposed at two positions separated from each other in the longitudinal direction (substantially in the vehicle forward/rearward direction) of the wheelhouse reinforcement member 14. The second bulkheads 41A and 41B are disposed at substantially the same positions as those of the first bulkheads 40A and 40B in the longitudinal direction of the wheelhouse reinforcement member 14. The upper closed cross section 31 is partitioned by the pair of second bulkheads 41A and 41B, and thus, a second filler chamber 48 filled with the filler 49 is formed between the second bulkheads 41A and 41B.

The first bulkheads 40A and 40B have base walls 40A-b and 40B-b extending to cross the lower closed cross section 30, upper flanges 40A-u and 40B-u (upper jointing pieces) extending to be bent at a substantially right angle from upper end portions of the base walls 40A-b and 40B-b, and lower flanges 40A-l and 40B-l (lower jointing pieces) extending to be bent at a substantially right angle from lower end portions of the base walls 40A-b and 40B-b. The upper flanges 40A-u and 40B-u (the upper jointing pieces) are bonded to a lower surface of the upper wall 14*u* of the wheelhouse reinforcement member 14, and the lower flanges 40A-l and 40B-l (the lower jointing pieces) are bonded to an upper surface of the outer base wall 11O-b of the outer rear wheelhouse 11O. The lower flanges 40A-l and 40B-l of the first bulkheads 40A and 40B extend to be bent in opposite directions. That is, both of the lower flanges 40A-l and 40B-l extend toward positions below the opening sections 33A of the upper wall 14*u* of the wheelhouse reinforcement member 14. Further, when the lower flanges 40A-l and 40B-l are connected to each other, productivity can be further improved.

In the opening sections 33A of the upper wall 14*u*, when the lower flanges 40A-l and 40B-l of the first bulkheads 40A and 40B are coupled to the outer base wall 11O-b of the outer rear wheelhouse 11O through welding, using rivets, or the like, a coupling tool can be inserted thereinto. Accordingly, previously jointing the first bulkheads 40A and 40B to the wheelhouse reinforcement member 14, and when the wheelhouse reinforcement member 14 is jointed to an upper surface side of the outer rear wheelhouse 11O, the lower flanges 40A-l and 40B-l of the first bulkheads 40A and 40B can be jointed to the outer rear wheelhouse 11O through the opening sections 33A.

The second bulkheads 41A and 41B have base walls 41A-b and 41B-b extending so as to cross the upper closed cross section 31, first lower flanges 41A-l1 and 41B-l1 (lower jointing pieces) extending to be bent at a substantially right angle from lower end portions of inside close portions 41A-b1 and 41B-b1 of the base walls 41A-b and 41B-b in the vehicle width direction, and second lower flanges 41A-l2 and 41B-l2 extending to be bent at a substantially right angle from lower end portions of outside close portions 41A-b2 and 41B-b2 of the base walls 41A-b and 41B-b in the vehicle width direction. The first lower flanges 41A-l1 and 41B-l1 are jointed to the upper surface of the upper wall 14*u* of the wheelhouse reinforcement member 14, and the second lower flanges 41A-l2 and 41B-l2 are jointed to the upper surface of the outer flange section 14*o* of the wheelhouse reinforcement member 14 or the upper surface of the outer base wall 11O-b of the outer rear wheelhouse 11O. While upper ends of the base walls 41A-b and 41B-b are set to have a gap between the wheelhouse section 15*b* of the side outer panel 15 and the upper ends, the gap is set narrow so as to minimize a leakage of the filler 49. In addition, as shown in FIG. 5, the second bulkheads 41A and 41B further include side section flanges 41A-s and 41B-s jointed to an outer surface of the sidewall 14s of the wheelhouse reinforcement member 14 in the vehicle width direction.

Here, the first lower flanges 41A-l1 and 41B-l1 of the second bulkheads 41A and 41B are overlapped with the upper flanges 40A-u and 40B-u (the upper jointing pieces) of the first bulkheads 40A and 40B in three layers while having the upper wall 14u of the wheelhouse reinforcement member 14 interposed therebetween, and are coupled to the upper wall 14u through welding, by rivets, or the like, in a three-layered state.

In addition, a filling opening 45 for filling the second filler chamber 48 and the first filler chamber 47 with the filler 49 is formed at a position in the outer standing wall 11O-a of the outer rear wheelhouse 11O that faces the second filler chamber 48. The second filler chamber 48 is filled with the filler 49 through the filling opening 45 after the wheelhouse reinforcement member 14, the first bulkheads 40A and 40B, the second bulkheads 41A and 41B, the side outer panel 15, and the like, are assembled to the rear wheelhouse 11. For this reason, some of the filler 49 filled in the second filler chamber 48 is filled in the first filler chamber 47 through the opening sections 33A of the upper wall 14u of the wheelhouse reinforcement member 14.

As described above, in the vehicle body reinforcement structure of the embodiment, the elongated closed cross section 21 (the hollow structure) between the rear wheelhouse 11 (the inner panel) and the side outer panel 15 (the outer panel) is partitioned into the lower closed cross section 30 and the upper closed cross section 31 by the wheelhouse reinforcement member 14 (the reinforcement member) to increase strength and rigidity in the longitudinal direction. Then, deformation of the lower closed cross section 30 or the upper closed cross section 31 in a collapse direction is restricted by the first bulkheads 40A and 40B or the second bulkheads 41A and 41B, and strength and rigidity in a direction perpendicular to the longitudinal direction of the elongated member is increased. Further, the first filler chamber 47 or the second filler chamber 48 filled with the filler 49 can further increase strength and rigidity of the lower closed cross section 30 or the upper closed cross section 31. Even in the first filler chamber 47 or the second filler chamber 48 that is narrow can be filled with the filler 49 by applying the filler 49 in a liquid state, through the filling opening 45 or a communication hole 33A (an opening section) for the filler 49. In particular, it is useful for the elongated member having a narrow closed cross section 21 (a hollow structure) where the cross section between the rear wheelhouse 11 (the inner panel) and the side outer panel 15 (the outer panel) cannot be secured. Accordingly, noise can be suppressed from entering the passenger compartment while damping properties or sound insulating properties can be increased and reduction in vehicle body vibrations can be achieved.

In addition, deformation of the lower closed cross section 30 in the collapse direction is restricted by the first bulkheads 40A and 40B, and thus, strength and rigidity in a direction perpendicular to the longitudinal direction are increased. The collapse deformation of the upper closed cross section 31 is similarly restricted by the second bulkheads 41A and 41B, and thus, strength and rigidity in the direction perpendicular to the longitudinal direction are increased. Accordingly, in the closed cross section 21 (the hollow structure) between the rear wheelhouse 11 (the inner panel) and the side outer panel 15 (the outer panel), strength and rigidity are efficiently increased by the wheelhouse reinforcement member 14, the first bulkheads 40A and 40B and the second bulkheads 41A and 41B. Accordingly, when this configuration is employed, strength and tolerance with respect to an impact load input from a side of the vehicle is increased, and also increased with respect to bending stress in the upward/downward direction.

In addition, in the vehicle body reinforcement structure of the embodiment, the lower ends of the first bulkheads 40A and 40B are coupled to the upper surface of the outer rear wheelhouse 11O (the rear wheelhouse 11), and the upper ends of the first bulkheads 40A and 40B are coupled to the lower surface of the upper wall 14u of the wheelhouse reinforcement member 14. For this reason, collapse of the lower closed cross section 30 in the upward/downward direction formed between the wheelhouse reinforcement member 14 and the outer rear wheelhouse 11O can be reliably restricted by the first bulkheads 40A and 40B. Accordingly, even in an area in which the cross-sectional area of the lower closed cross section 30 cannot be easily sufficiently secured, collapse of the lower closed cross section 30 in the upward/downward direction can be reliably restricted.

In addition, in the vehicle body reinforcement structure of the embodiment, the opening sections 33A configured to allow insertion of a tool that couples the lower ends of the first bulkheads 40A and 40B to the outer rear wheelhouse 11O (the rear wheelhouse 11) are provided in the upper wall 14u of the wheelhouse reinforcement member 14.

For this reason, in a state in which the first bulkheads 40A and 40B are previously fixed to the wheelhouse reinforcement member 14, a joining work of the first bulkheads 40A and 40B and the outer rear wheelhouse 11O can be performed through the opening sections 33. Accordingly, when this configuration is employed, since the assembly efficiently of the components is improved, productivity can be increased.

Further, in the vehicle body reinforcement structure of the embodiment, the upper flanges 40A-u and 40B-u of the first bulkheads 40A and 40B and the first lower flanges 41A-l1 and 41B-l1 of the second bulkheads 41A and 41B are coupled in three-layered state in which the upper wall 14u of the wheelhouse reinforcement member 14 is interposed between the upper flanges 40A-u and 40B-u of the first bulkheads 40A and 40B and the first lower flanges 41A-l1 and 41B-l1 of the second bulkheads 41A and 41B. For this reason, in a state in which the upper flanges 40A-u and 40B-u of the first bulkheads 40A and 40B and the first lower flanges 41A-l1 and 41B-l1 of the second bulkheads 41A and 41B are overlapped with the upper wall 14u of the wheelhouse reinforcement member 14, the three members can be simultaneously coupled through spot welding, by rivet stoppers, or the like. Accordingly, when this configuration is employed, productivity can be further increased.

In addition, in the embodiment, the first filler chamber 47 is formed inside the lower closed cross section 30 by disposing the pair of first bulkheads 40A and 40B inside the lower closed cross section 30, and the second filler chamber 48 is formed inside the upper closed cross section 31 by disposing the pair of first bulkheads 40A and 40B inside the upper closed cross section 31. Then, the filling opening 45 is formed in the area of the outer standing wall 11O-a of the outer rear wheelhouse 11O that faces the second filler chamber 48, and the opening sections 33A is formed in the upper wall 14u of the wheelhouse reinforcement member 14 so as to bring the second filler chamber 48 and the first filler chamber 47 in communication with each other. For this reason, after the components around the rear wheelhouse are assembled, the second filler chamber 48 and the first filler chamber 47 can be easily filled with the filler 49 in a liquid state or a foam state through the filling opening 45. Then, when the filler 49 is solidified in the first filler chamber 47 and the second filler chamber 48, rigidity or strength of the lower closed cross section 30 and the upper closed cross section 31 is efficiently and partially increased.

In addition, when a foaming material, insulating urethane foam, or the like, having damping properties or sound insulating properties is used as the filler 49, reduction in vehicle body vibrations can be achieved, and entry of noise into the passenger compartment can be minimized.

Further, the present invention is not limited to the embodiment, and various design changes may be made without departing from the scope of the present invention.

REFERENCE SIGNS LIST

11 . . . Rear wheelhouse (inner panel)
14 . . . Wheelhouse reinforcement member (reinforcement member)
15 . . . Side outer panel (outer panel)
21 . . . Closed cross section (hollow structure)
30 . . . Lower closed cross section
31 . . . Upper closed cross section
33A . . . Opening section (communication hole)
40A, 40B . . . First bulkhead (bulkhead)
41A, 41B . . . Second bulkhead (bulkhead)
40A-u, 40B-u . . . Upper flange (upper jointing piece)
41A-l1, 41B-l1 . . . First lower flange (lower jointing piece)
45 . . . Filling opening
47 . . . First filler chamber (filler chamber)
48 . . . Second filler chamber (filler chamber)
49 . . . Filler

The invention claimed is:

1. A vehicle body reinforcement structure comprising:
an elongated hollow structure formed by jointing an outer panel and an inner panel with each other; and
a reinforcement member configured to partition the hollow structure into a lower closed cross section and an upper closed cross section,
wherein, at inside of at least one of the lower closed cross section and the upper closed cross section, at least a pair of bulkheads extending so as to cross the closed cross section are disposed so as to be separated with each other in a direction in which the closed cross section is extending, a space between the pair of bulkheads is made as a filler chamber which is filled with filler, and a filling opening for the filler is provided in the inner panel so that the filling opening is in communication with the filler chamber,
wherein the bulkhead comprises two types of bulkheads, including a first bulkhead disposed inside of the lower closed cross section and a second bulkhead disposed inside of the upper closed cross section,
wherein a space in the lower closed cross section between the pair of first bulkheads is made as a first filler chamber filled with the filler,
a space in the upper closed cross section between the pair of second bulkheads is made as a second filler chamber filled with the filler,
a plurality of opening sections are formed in an upper wall of the reinforcement member and are separated from each other in a longitudinal direction of the reinforcement member, and, one of the plurality of opening sections having larger opening area than the other opening sections among the plurality of opening sections is made as a communication hole configured to bring the second filler chamber and the first filler chamber in communication with each other,
the pair of first bulkheads and the pair of second bulkheads are disposed at positions that have the communication hole interposed therebetween.

2. The vehicle body reinforcement structure according to claim 1, wherein the first bulkhead has a lower end coupled to an upper surface of the inner panel, and an upper end coupled to a lower surface of an upper wall of the reinforcement member.

3. The vehicle body reinforcement structure according to claim 2, wherein the one of the plurality of opening sections having larger opening area than the other opening sections among the plurality of opening sections allows insertion of a tool configured to couple the lower end of the first bulkhead to the upper surface of the inner panel.

4. The vehicle body reinforcement structure according to claim 1, wherein the first bulkhead has an upper jointing piece coupled to a lower surface of the upper wall of the reinforcement member,
the second bulkhead has a lower jointing piece coupled to an upper surface of the upper wall of the reinforcement member, and
the upper jointing piece and the lower jointing piece are coupled in three-layered state in which the upper wall of the reinforcement member is interposed between the upper jointing piece and the lower jointing piece.

5. The vehicle body reinforcement structure according to claim 1, wherein the reinforcement member is connected to an upper surface of a front section of a rear wheelhouse and is coupled to a side sill reinforcement member which is coupled to a rear section of a side sill.

* * * * *